(12) United States Patent
Kaburagi et al.

(10) Patent No.: US 7,577,391 B2
(45) Date of Patent: Aug. 18, 2009

(54) IMAGE PROCESSING SYSTEM

(75) Inventors: Hiroshi Kaburagi, Ohta-ku (JP); Shigeo Yamagata, Ohta-ku (JP); Isao Migishima, Ohta-ku (JP); Hiroyoshi Yoshida, Ohta-ku (JP); Toshihiko Ikeno, Ohta-ku (JP); Hiroyasu Morita, Ohta-ku (JP); Naohiro Isshiki, Ohta-ku (JP); Naoki Ito, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 466 days.

(21) Appl. No.: 11/201,681

(22) Filed: Aug. 11, 2005

(65) Prior Publication Data

US 2005/0264852 A1 Dec. 1, 2005

Related U.S. Application Data

(63) Continuation of application No. 10/650,328, filed on Aug. 28, 2003, now Pat. No. 6,978,112.

(30) Foreign Application Priority Data

Aug. 29, 2002 (JP) .............................. 2002-251712

(51) Int. Cl.
*G03G 21/00* (2006.01)
(52) U.S. Cl. ........................................ 399/366; 399/365
(58) Field of Classification Search ................ 399/366, 399/365
See application file for complete search history.

(56) References Cited

U.S. PATENT DOCUMENTS

| 6,678,069 B1 * | 1/2004 | Abe ........................... 358/1.18 |
| 7,019,857 B2 * | 3/2006 | Abe ........................... 358/1.15 |
| 2002/0060810 A1 * | 5/2002 | Shiraiwa ..................... 358/1.16 |

* cited by examiner

*Primary Examiner*—Anthony H. Nguyen
(74) *Attorney, Agent, or Firm*—Canon USA Inc IP Div

(57) ABSTRACT

An image processing system and method for copying an original document while maintaining the security of the document and for providing a high quality copy each time a copy is required. The system and method include inputting image information, generating output limitation information corresponding to the inputted image information, storing the inputted image information and the corresponding output limitation information, reading a document containing specifying information for specifying the stored image information, outputting the stored specified image information in accordance with reading of the specifying information, determining whether the image information specified by reading the specifying information is to be output based on the output limitation information corresponding to the image information, controlling the outputting of the image information in accordance with the determination, and varying the output limitation information corresponding to the image information in accordance with outputting of the image information.

17 Claims, 9 Drawing Sheets

IMAGE PROCESSING SYSTEM

CROSS-REFERENCE TO RELATED APPLICATIONS

This application is a continuation of application Ser. No. 10/650,328, filed Aug. 8, 2003, the contents of which are hereby incorporated by reference.

BACKGROUND OF THE INVENTION

1. Field of the Invention

The present invention relates to an image processing apparatus, an image processing system and an image processing method that can be applied, for example, to a copier having an electro-photographic process, or a copier having another process, and to a computer readable storage medium storing a program for executing the method, and the program.

2. Description of the Related Art

Management of confidential documents has taken various forms over the years. The simplest method has been to place the term "Confidential Information" or a similar term onto the pages of the confidential document. Another method is where the device making a copy of the confidential document, such as a digital copier, embeds a security watermark (e.g., "copying of this document is prohibited") onto the document during the copying operation. And, in still yet another method, the original document is produced on a special type of recording medium such that when an attempt is made to copy the original, the resulting copy is all black.

The above-described conventional document management methods range from allowing an original document to be completely copied to not allowing an original document to be copied at all. For example, the method of only placing the term "Confidential Information" onto the pages of an original document does not in and of it self prevent copying of the original. It is really nothing more than a notice that the contents of the document are considered confidential. On the other hand, the method of entirely blacking out the resulting copy of an original document prevents anyone from copying the original, even if all or parts of the original are allowed to be copied.

For example, suppose a case in which it is desired to provide a required number of copies of a confidential document distributed to a director some days after it has been distributed, in order to explain the contents to junior personnel of the director. Conventionally, it has been impossible to provide such copies because, for example, the resulting copies are entirely black, or characters "copying prohibited" appear on the copies.

In addition to document security, there is a concern about the degradation in the quality of the copies as additional copies are made/needed. For example, in the case where copies of a confidential document are required at different times, typically, the initial set of copies are made from the original document. Any subsequent set is made from one of the initial set of copies. Any subsequent sets made after are made from the preceding set. Since each subsequent set of copies is made from a copy, and not the original, the quality of each subsequent set tends to degrade.

What is needed is an image processing system and method that provides a mechanism for copying an original document while maintaining the security of that document, if needed, and providing a high quality copy each time a copy is required.

SUMMARY OF THE INVENTION

One facet of the present invention is to provide an image processing system in which the above-described problems are solved.

Another facet of the present invention is to provide an image processing system in which a desired original document can be copied whenever necessary and excellent copies can be obtained while improving security.

Still another facet of the present invention is to provide an image processing system that allows provision of various output limitation conditions for original information.

Still yet another facet of the present invention is to provide an image processing system in which original information can be acquired from a desired location.

According to one aspect of the present invention, an image processing apparatus includes an input unit for inputting image information, a generating unit for generating output limitation information to the image information input by the input unit, a storing unit for storing the image information input by the input unit and the output limitation information generated by the generating unit, a reading unit for reading a document wherein the document contains output limitation information, and an output unit for outputting the image information stored by the storing unit in accordance with reading of the output limitation information by the reading unit.

According to another aspect of the present invention, an image output method includes an input step of inputting image information, a generating step of generating output limitation information corresponding to the image information input in the input step, a storing step of storing the image information input in the input step and the output limitation information generated in the generating step, a reading step of reading a document wherein the document contains output limitation information, and an output step of outputting the image information stored in the storing step in accordance with reading of the output limitation information in the reading step.

According to still another aspect of the present invention, a computer executable program, stored in a storage medium, includes an input step of inputting image information, a generating step of generating output limitation information corresponding to the image information input in the input step, a storing step of storing the image information input in the input step and the output limitation information generated in the generating step, a reading step of reading a document wherein the document contains output limitation information, and an output step of outputting the image information stored in the storing step in accordance with reading of the document limitation information in the reading step.

Further features of the present invention will become apparent from the following description of the exemplary embodiments (with reference to the attached drawings).

DESCRIPTION OF THE EXEMPLARY EMBODIMENTS

Exemplary embodiments of the present invention will now be described with reference to the drawings.

First Embodiment

Figure 1:
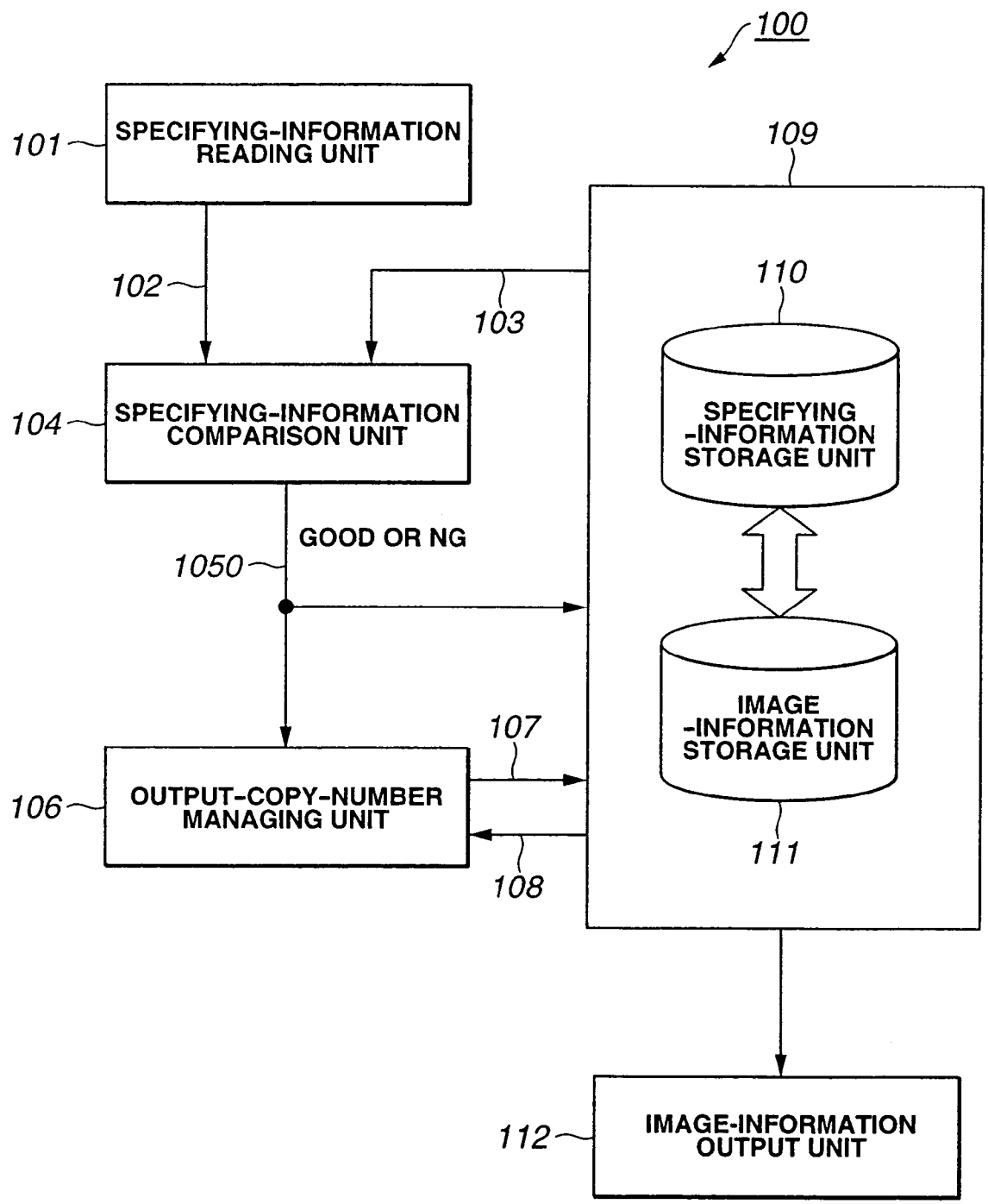
FIG. 1 is a block diagram illustrating the configuration of a copier according to a first embodiment of the present invention.
Figure 2:
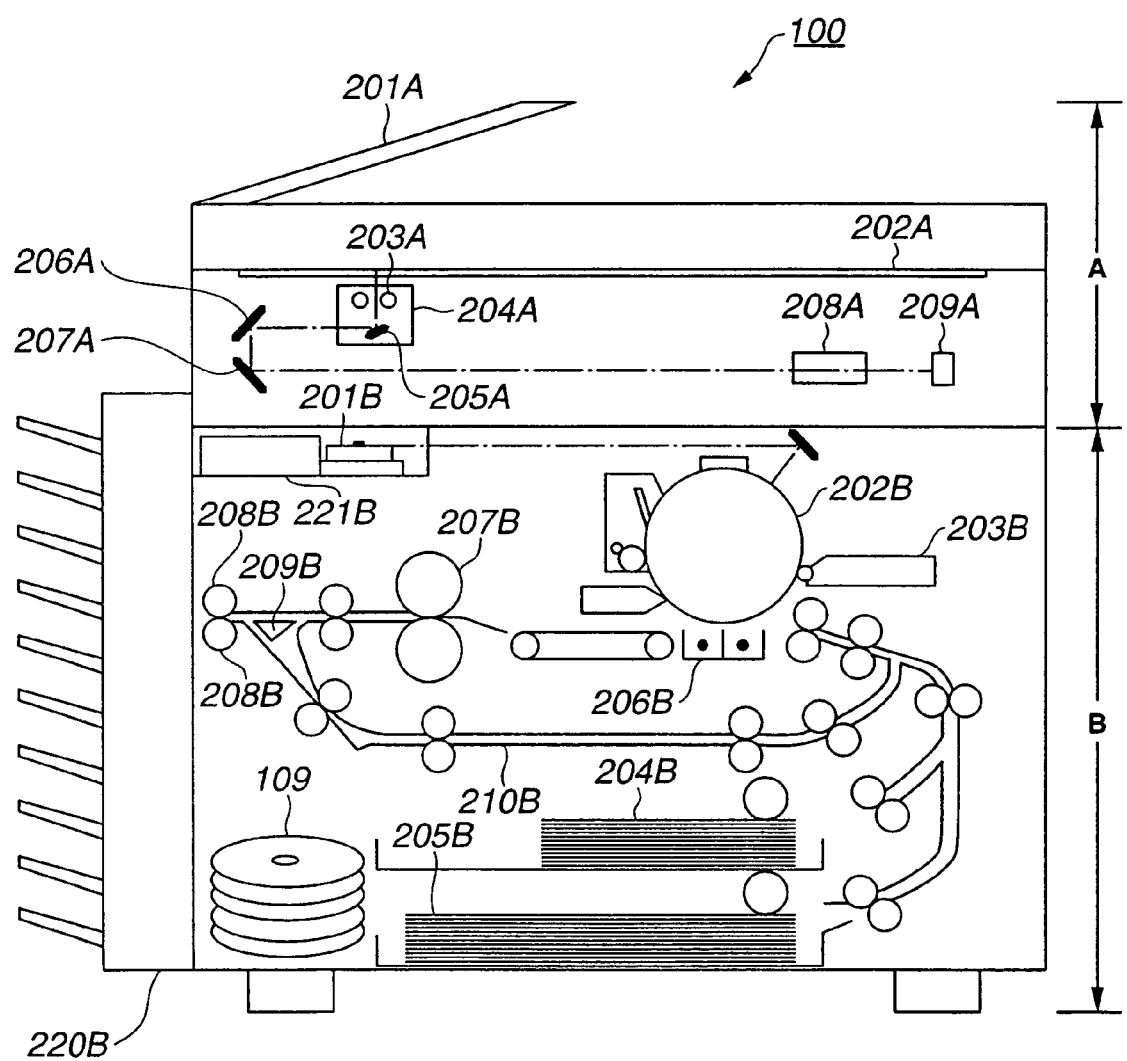
FIG. 2 is a diagram illustrating an image-information output unit of the copier shown in FIG. 1.

FIGS. 1 and 2 illustrate the configuration of a copier 100 according to a first embodiment of the present invention. The copier 100 has an electro-photographic process, and is configured to control copying of an original based on pre-defined specifying information including, but not limited to, limitation on the number of copies that can be made, allowing copying to be performed only within a specified time limit, password-protected copying, and prohibiting copying completely.

Accordingly, as shown in FIG. 1, the copier 100 includes specifying-information reading unit 101 for reading specifying information relating to an original, a storage unit 109 for storing in pre-defined specifying information and image information of the original, a specifying-information comparison unit 104 for comparing the specifying information read by the specifying-information reading unit 101 with specifying information stored in the storage unit 109, image-information output unit 112 for reading corresponding image information from the storage unit 109 based on the result of comparison by the specifying-information comparison unit 104 and outputting the read image information, and output-copy-number managing unit 106 for counting a number of copies output from the image-information output unit 112 and storing the counted number in the storage unit 109.

The configuration and the operation of the copier 100 will now be more specifically described.

Copier 100 described in the first embodiment uses an electro-photographic process. However, the present invention is not limited to this process and any process that would allow practice of the present invention is applicable.

Formation of an Original Manuscript

Before describing the configuration and the operation of the copier 100, formation of an electronic original manuscript will be described.

Figure 3:
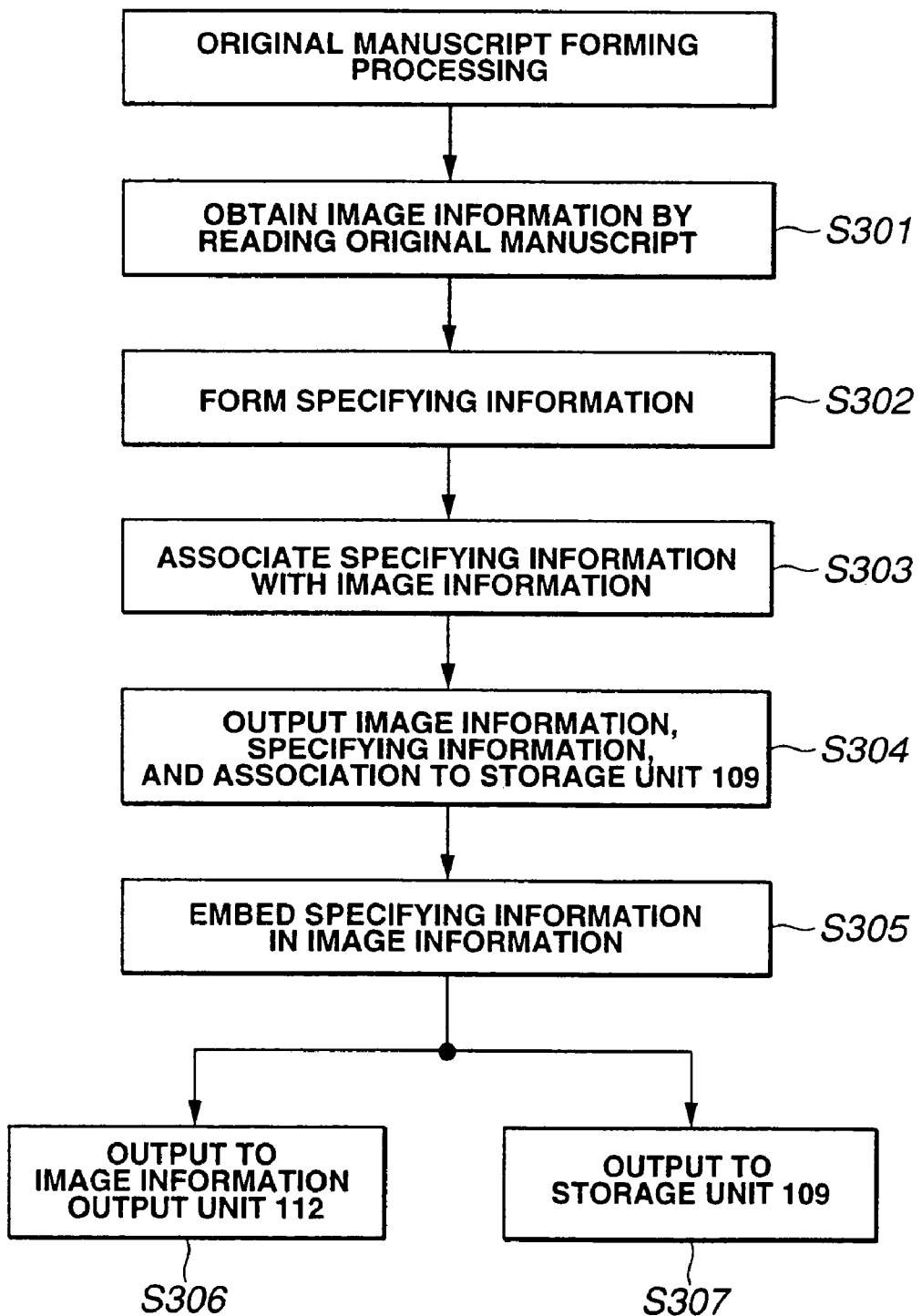
FIG. 3 is a flowchart illustrating processing for forming an original manuscript (specifying information/image information) to be used in the copier shown in FIG. 1.

FIG. 3 is a flowchart illustrating processing for forming an original manuscript. An arbitrary apparatus or system with a central processing apparatus (CPU) having a computer function that executes a program conforming to the flowchart of FIG. 3 can perform the processing depicted in FIG. 3.

In step S301, an electronic image of the original document is preferably formed by reading information relating to the original image by optically scanning a physical manuscript (i.e., a sheet or sheets of paper, a book, etc.). In another embodiment, the electronic image is created using a software application running on a computer. Creation of an electronic image from an original document is not limited to either of these methods and any method that would allow practice of the present invention is applicable.

In step S302, specifying information for controlling copying of the original image information is formed/obtained. Exemplary contents of the specifying information are described below with respect to FIG. 5 and an exemplary method for storing the contents is described below with respect to FIG. 9.

Following generation of the original image information in step S301 and the specifying information in step S302, in step S303, the specifying information generated is associated with the original-image information. In the exemplary embodiment, the specifying information is saved as part of the image information's metadata, which is created when the original image information is created. The present invention is not limited to this method of associating the specifying information with the original image information, and any method that would allow associating the specifying information with the original image information that would allow practice of the present invention is applicable.

Once the specifying information and original image information have been associated, the specifying information, original image information, and association information are all outputted to and stored in storage unit 109 in step S304. The structure of the specifying information when stored in described below with respect to FIG. 5.

In step S305, the specifying information is embedded in the original image information. The method of embedding the specifying information in the original image information can be any method known to those skilled in the art, and thus, no detailed discussion on how to embed the specifying information is provided.

Figure 4:
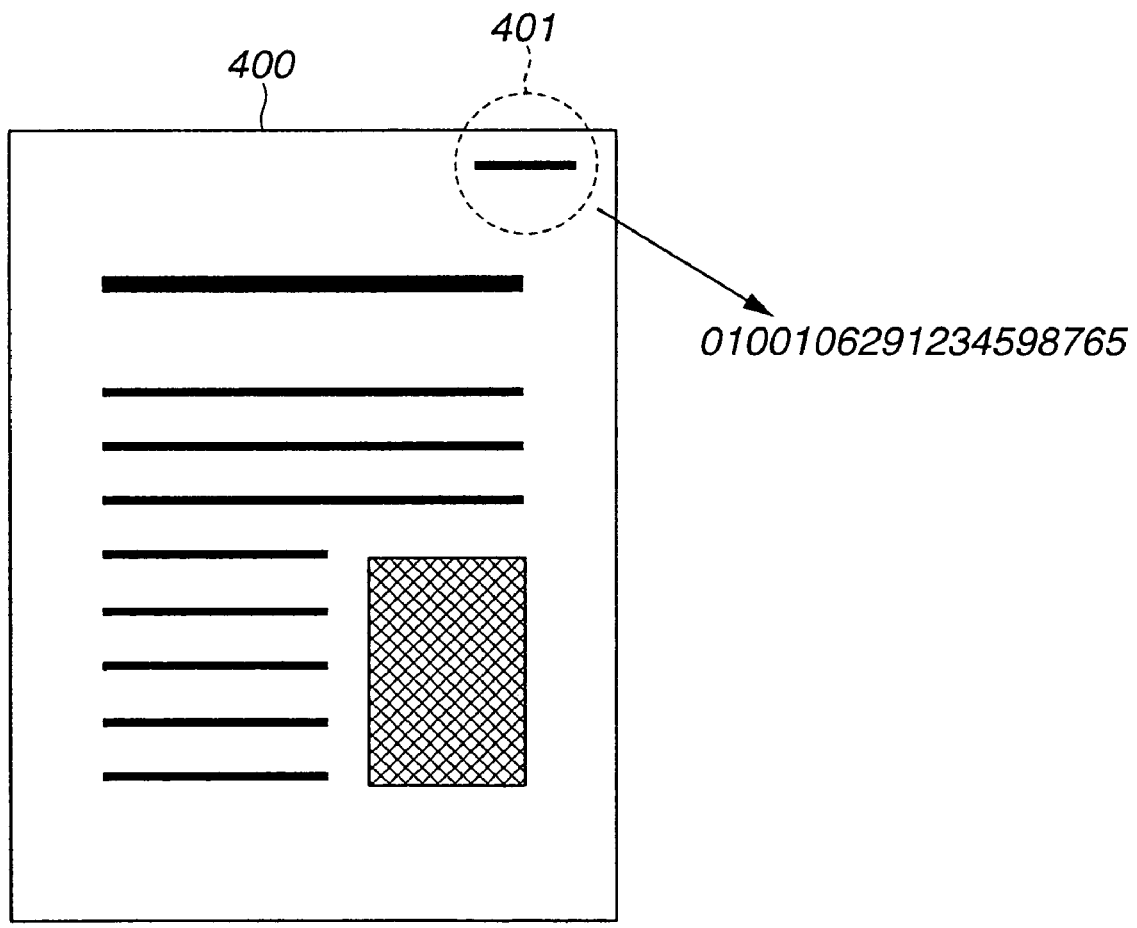
FIG. 4 is a diagram illustrating an original manuscript in which the above-described specifying information is embedded.

FIG. 4 is a diagram illustrating the results of embedding specifying information in original image information.

As shown in FIG. 4, specifying information 401 (within a circle formed by broken lines at the upper right corner) is embedded in original-image information 400 (one page of the original manuscript).

In step S304, original image information (original manuscript) 400 with embedded specifying information 401 is printed by image information output (printing) unit 112. The process of embedding specifying information 401 in original image information 400 and printing the result is described below in more detail in reference to FIG. 2 and FIG. 6.

At that time, when intending to perform printing for the above-described copying prohibiting sheet, copying cannot be performed except for a configuration to be described later. Hence, security can be more effectively realized.

However, when the sheet to be copied is a copying prohibiting sheet that becomes entirely black when image information output unit 112 performs printing (copying), it is, of course, necessary to allow reading of only specific information. A specific method for providing such a state is embedding data relating to background (for example, white) and character information, instead of embedding only character information.

In step S306, the original image information with embedded specifying information is outputted and stored in storage unit 109.

In the first embodiment, when printing (copying) the original manuscript generated in the above-described manner by the image-information output unit 112 according to a configuration to be described later, the original image information with embedded specifying information is obtained directly from the storage unit 109. Hence, the resulting copy has less degradation of the image quality compared with the case where a copy is obtained by scanning and reading an original, printing the read image, and then scanning and printing the read image again.

Figure 5:
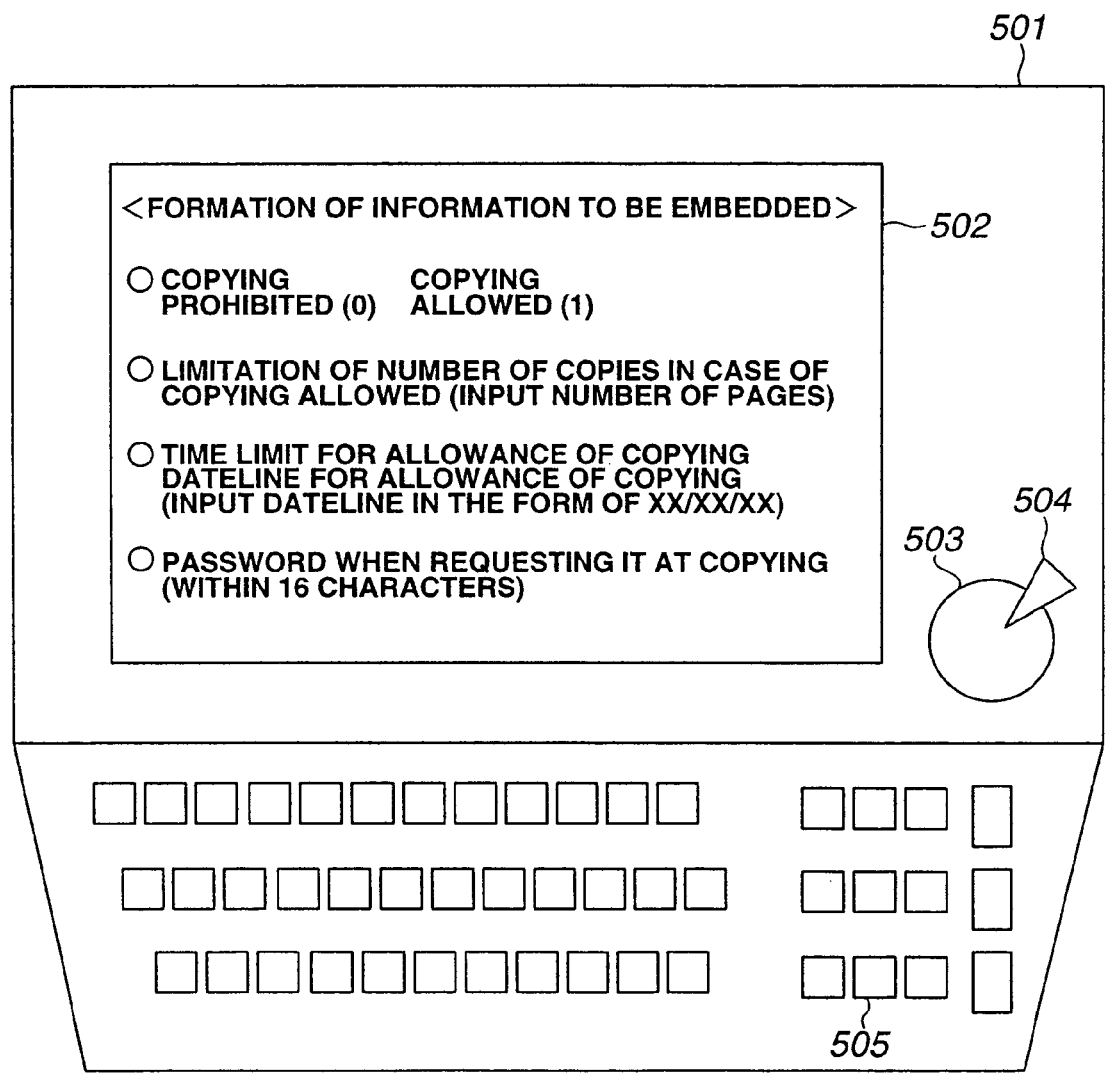
FIG. 5 is a diagram illustrating an operation unit for inputting the specifying information.

FIG. 5 illustrates an operation unit 501 for executing the operation of generating and copying the above-referenced original manuscript.

As shown in FIG. 5, the operation unit 501 includes a display portion 502, a copying start button 503, a stop button 504, and a keyboard 505 for inputting information.

Display portion 502 in FIG. 5 displays the specifying information that is to be associated with a particular original manuscript, and is input (set) through the keyboard 505 of the operation unit 501. Copying start button 503 is used to initiate the copying operation for copying the original manuscript. Stop button 504 terminates the copying operation.

In the exemplary embodiment, the specifying information is input (set) prior to initiating the copying operation. In another embodiment, the specifying information can be input (set) after the copying operation has concluded. The following is an exemplary list of specifying information to be input (set). However, the present invention is not limited to this list, and any combination of the below described specifying information that would allow practice of the present invention would be applicable. In addition, any specifying information in addition to the ones listed below that would allow practice of the present invention would also be applicable.

(1) "Copying prohibited/copying allowed" is used to indicate whether or not an original manuscript can be copied. When "copying prohibited" is set, an original manuscript formed using the above-described copying prohibiting sheet cannot be copied. On the other hand, when "copying allowed" is set, even if an original manuscript is formed using the copying prohibiting sheet, the manuscript can be copied using the copier 100.

(2) "Limitation of the number of copies" set when "copying allowed" is set. According to a configuration to be described later in detail, by setting a desired number of copies in the storage unit 109 as "limitation of the number of copies", and counting the number of copies made, copying can be performed up to the set desired number of copies.

(3) "Time limit for allowance of copying" and "date for allowance of copying". By setting information relating to "time limit for allowance of copying" and "date for allowance of copying", it is possible to allow copying within a time limit, or after an arbitrary date. For example, when no problem arises even if a confidential document relating to a product is copied after release of the product, the date of release of the product is set as "date for allowance of copying". In the exemplary embodiment, the format for entering the date(s) is XX/XX/XX, where the first set of "Xs" represents the month, the second set of "Xs" represents the day, and the third set of "Xs" represents the year. The present invention is not limited to this format, and any other format for representing a date that would allow practice of the present invention is applicable.

(4) "Password" set when intending to request it at copying". By setting a password, one will be requested at the time a copying operation is initiated.

After the above-described specifying information has been input (set) through the operation unit 501, copying of the original manuscript is initiated by depressing copying start button 503. In the event the copying operation has to be terminated before it is completed, stop button 504 is depressed. Upon completion of the copying operation, both the specifying information and the original image information associated with the just copied original manuscript are stored in storage unit 109 in the manner described above.

Figure 9:
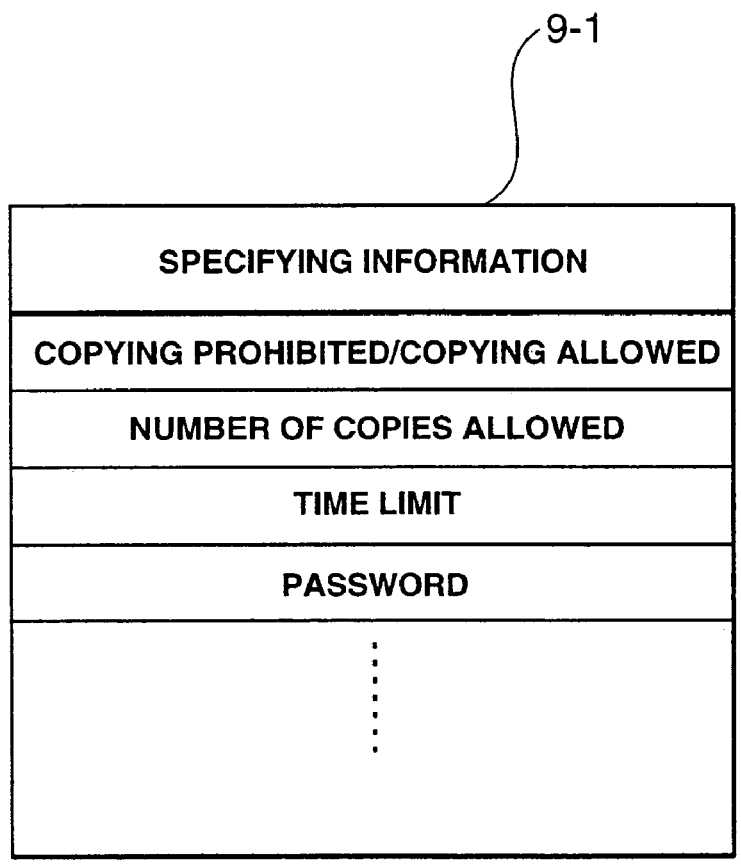
FIG. 9 is a block diagram illustrating the structure of the specifying information when stored according to the first embodiment of the present invention.

FIG. 9 is a block diagram illustrating the structure of the specifying information when stored according to the first embodiment of the present invention. Table 9-1 contains the information entered by keyboard 505 for the specifying information displayed on display 502. FIG. 9 represents an exemplary structure for storing the specifying information, however, any structure for storing the information that would enable practice of the present invention is applicable.

Specifying information 401 shown in FIG. 4 is encrypted in the sense that the information provided through operation unit 501 is represented in original image information 401 by numerals ranging from 0-9. The particular method of encrypting the specifying information can be any method known to those skilled in the art, and thus, no detailed discussion on how to encrypt the specifying information is provided. However, the present invention is not limited to such an approach. In yet another embodiment, specifying information 401 may be embedded in the form of a bar code, or in still yet another embodiment, specifying information 401 may be embedded according to a technique such as an electronic watermark or the like.

Encrypting the specifying information does not result in the security sought to be provided by the present invention, but rather embedding the specifying information does. Accordingly, the objects of the present invention may, of course, be achieved by embedding specifying information in an original manuscript in a state in which the specifying information is not encrypted. However, if a password is included in the specifying information, the password must be encrypted depending on the situation.

Configuration and Operation of the Copier 100

As shown in FIG. 1, the copier 100 includes the specifying-information reading unit 101, the specifying-information comparison unit 104, the output-copy-number managing unit 106, the storage unit 109, and the image-information output unit 112.

The specifying-information reading unit 101 reads specifying information relating to security that is input (set) through the operation unit 501 of FIG. 5 and embedded in original information 400 as described above. It is not necessary for any other images to be read.

As previously described, the specifying information includes, but is not limited to, (1) "copying prohibited/coping allowed" of a manuscript, (2) "limitation of the number of copies (the number of pages) in case of "copying allowed", (3) time limit for allowance of copying/"date" for allowance of copying, (4) "password" to be requested at copying.

The specifying-information comparison unit 104 receives the specifying information obtained by the specifying-information reading unit 101 as a signal 102.

The signal 102 is a signal after the specifying information reading unit 101 has read the specifying information, and the numerical value of the specifying information has been recognized. In the first embodiment, the signal 102 is, for example, "0100106291234598765" which represents the specifying information 401 shown in FIG. 4. Since a general technique known to those skilled in the art, such as optical character recognition (OCR) or the like, can be applied to a method for recognizing the numerical value, no detailed discussion on how the numerical value is recognized is provided.

Specifying information comparison unit 104 also receives the specifying information that was entered via operation unit 501 at the time the original manuscript was copied from the storage unit 109 as a signal 103.

Specifying-information comparison unit 104 then compares the signal 102 from the specifying-information reading unit 101 with the signal 103 from the storage unit 109. If the two signals coincide, specifying information comparison unit 104 transmits a signal (Good) 105 to the storage unit 109 and the output-copy-number managing unit 106. If the two signals do not coincide, specifying information comparison unit 104 transmits a signal (NG) 105 indicating the fact to the storage unit 109 and the output-copy-number managing unit 106. The particular method of comparing signals 102 and 103 can be any method known to those skilled in the art, and thus, no detailed discussion how signals 102 and 103 are compared is provided.

When the storage unit 109 receives the signal (Good) 105 from the specifying-information comparison unit 104, the storage unit 109 extracts image information corresponding to the specifying information from the image-information storage unit 111, and transmits the extracted information to the image-information output unit 112.

The image-information output unit 112 prints the image information from the storage unit 109 onto a recording medium.

When the output-copy number managing unit 106 that is a feature of the first embodiment receives the signal (Good) 105 from the specifying-information comparison unit 104, the output-copy managing unit 106 counts the number of copies output from the image-information output unit 112.

The output-copy-number managing unit 106 adds the count value to the number of past output copies transmitted from the storage unit 109 as a signal 108, and transmits the resultant value to the storage unit 109 as a signal 107.

The storage unit 109 stores the signal 107 from the output-copy-number managing unit 106 in the specifying-information storage unit 110 as a total number of printouts for each manuscript.

In the first embodiment, the output-copy-number managing unit 106 counts the number of printouts that are provided from the image-information output unit 112. More specifically, for example, the counting control is performed while confirming printouts from the image-information output unit 112 via a CPU having a computer function. In the first embodiment, the specifying-information storage unit 110 and the image-information storage unit 111 are independently provided. However, a single storage unit may manage specifying information and image information by embedding specifying information in a header portion of a corresponding image information.

Operation of the Specifying-Information Comparison Unit 104

Figure 6:
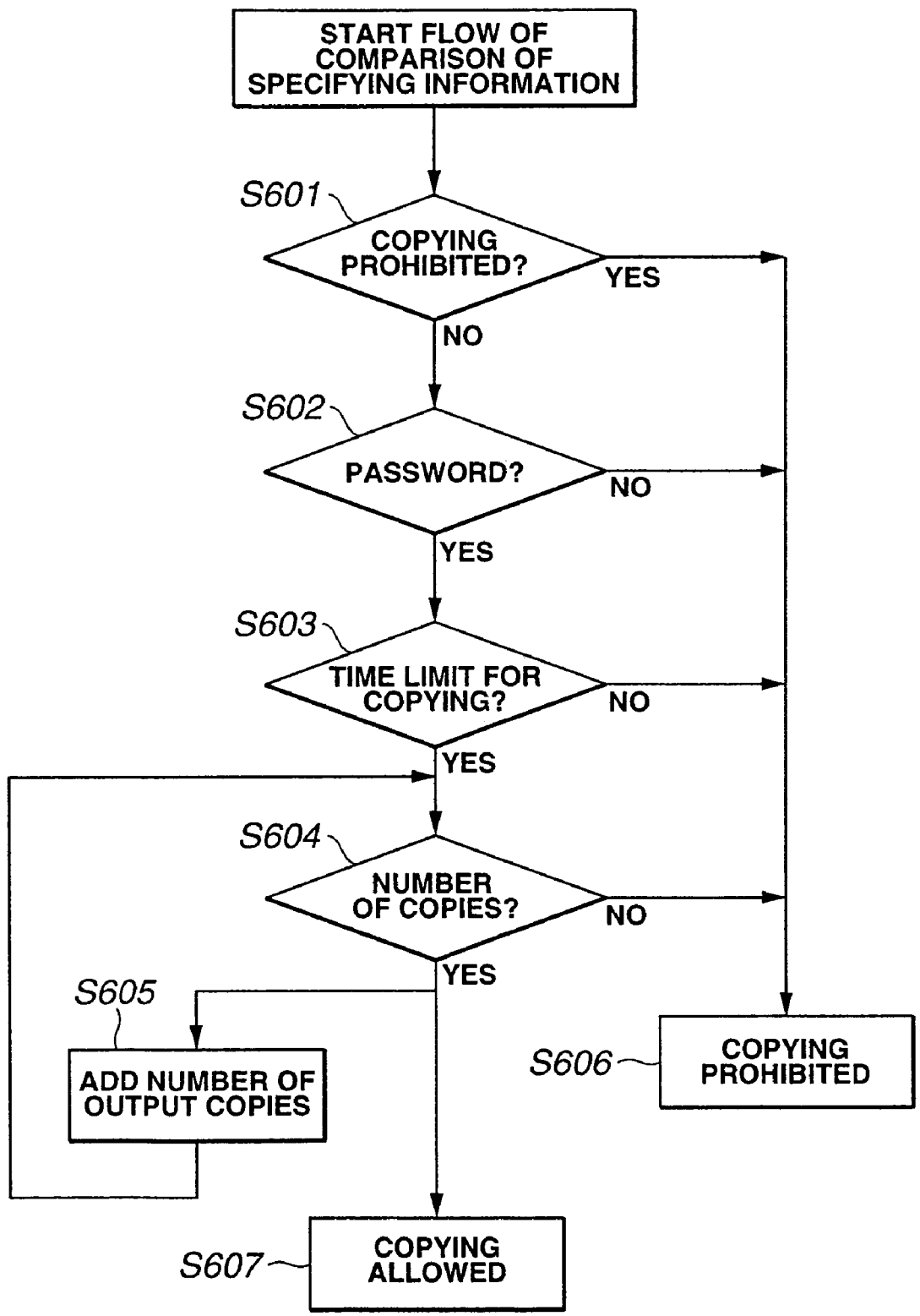
FIG. 6 is a flowchart illustrating the operation of a specifying-information comparison unit of the copier shown in FIG. 1.

FIG. 6 is a flowchart illustrating the operation of the specifying-information comparison unit 104 for generating the signal (Good/NG) 105 based on the result of comparing the signal 102 (representing specifying information embedded in original information 400) from the specifying-information reading unit 101 with signal 103 (representing specifying information obtained at the time the original manuscript was copied) from the storage unit 109.

In step S601, the specifying-information comparison unit 104 determines whether or not copying-prohibiting information is included in the specifying information embedded in the original information 400 by comparing signals 102 and 103. If the result of the determination in step S601 is affirmative, the process proceeds to step S606. If the result of the determination in step S601 is negative, the process proceeds to step S602.

The specifying-information comparison unit 104 in step S602 determines whether or not a password is included in the specifying information embedded in original information 400 by comparing signals 102 and 103. If the result of the determination is affirmative, then, for example, when a password is requested to the user through the operation unit 501 shown in FIG. 5, and the password input from the user in response to the request coincides with the password included in the specifying information, the process proceeds to step S603. In other cases, the process proceeds to step S606. When the password input form the user does not coincide with the password included in the specifying information, the process unconditionally proceeds to step S606.

In step S603, the specifying-information comparison unit 104 determines whether or not information relating to the time limit for copying is included in the specifying information embedded in original image information 400 by comparing signals 102 and 103. If the result of the determination is affirmative, and the present time is within the time limit, the process proceeds to step S604. In other cases, the process proceeds to step S606.

In step S604, the specifying-information comparison unit 104 determines whether or not information relating to the allowed number of copies is included in the specifying information embedded in original image information 400 by comparing signals 102 and 103. If the number of past copies stored in the above-described manner exceeds the allowed number of copies included in the specifying information, the process proceeds to step S606. In other cases, the process proceeds to step S607.

The specifying-information comparison unit 104 in step S606 outputs the signal 105 indicating NG in order to immediately prohibit copying.

In step S605, the specifying-information comparison unit 104 outputs the signal 105 indicating Good in order to immediately allow copying (Step S607). The image-information output unit 112 thereby executes a copying operation. At that time, the output-copy-number managing unit 106 counts the number of copies (step S605).

Accordingly, the specifying-information comparison unit 104 determines in step S604 whether or not the number of copies (the number of printouts) exceeds the allowed number of copies (the set number of copies) included in the specifying information based on the count value of the output-copy-number managing unit 106. When the number of printouts exceeds the set number during a copying operation as a result of the determination in step S604, the process proceeds to step S606 for immediately interrupting the copying operation.

Basic Configuration and the Operation of the Image-Information Output Unit 112

The basic configuration of the image-information output unit 112, and the operation of the image-information output unit 112 in the case of allowance of copying will now be described with reference to FIG. 2. FIG. 2 mainly illustrates the configuration of the image-information output unit 112 in the copier 100. Although the image-information output unit 112 is assumed to have an electro-photographic process, the present invention is not limited to such a case.

As shown in FIG. 2, the image-information output unit 112 includes a color scanner unit A and a printer unit B as mechanical configurations.

When executing the original-manuscript forming processing shown in FIG. 3, the color scanner unit A is used, and when actually outputting (copying) image information on a sheet, the printer unit B is used.

In the color scanner unit A, a manuscript-feeding unit 201A individually feeds sheets of a manuscript onto platen glass 202A starting from the final page, and discharges each of the sheets of the manuscript on the platen glass 202A after completing an operation of reading that sheet.

A lamp 203A is lit when the manuscript is conveyed onto the platen glass 202A. A scanner unit 204A that mounts the lamp 203A performs exposure scanning of the manuscript while moving.

Reflected light from the manuscript caused by the scanning is guided to a charge-coupled device (CCD) color image sensor 209A by mirrors 205A, 206A and 207A, and a lens 208A.

The CCD 209A reads the reflected light and outputs luminance signals for respective colors, i.e., R, G and B, by performing color separation.

The luminance signals output from the CCD 209A are converted into digital signals (analog-to-digital-conversion), for example, according to a computer function of the copier 100. After being subjected to image processing, such as shading correction, gradation correction and the like, the digital signals are transferred to the storage unit 109 and the printer unit B as digital image data.

The storage unit 109 stores specifying information and image information as described above, based on the transferred image data.

It is, of course, possible to read the image on the manuscript without using the manuscript feeding unit 201A by placing the manuscript on the platen glass 202A.

In the printer unit B, a laser driver 221B drives a laser emission unit 201B, and causes the laser emission unit 201B to emit a laser beam corresponding to image data for each color.

The laser beam emitted from the laser emission unit 201B is projected onto a photosensitive drum 202B. A latent image corresponding to the laser beam is formed on the photosensitive drum 202B.

Particles of a toner, serving as a developer, are caused to adhere to the portion of the latent image on the photosensitive drum 202B by a developing unit 203B.

In FIG. 2, in order to simplify illustration, only one developing unit 203B is shown. Actually, however, toners of respective colors, i.e., C (cyan), M (magenta), Y (yellow) and K (black), are prepared, and four developing units for the respective toners are provided. Instead of the above-described configuration, four pairs of a photosensitive drum, a developing unit and the like may be provided for the respective colors.

At a timing synchronized with start of projection of the laser beam, a recording sheet is fed from a selected one of cassettes 204B and 205B, and is conveyed to a transfer unit 206B. Thus, the developer adhering to the photosensitive drum 202B can be transferred onto the recording sheet.

The recording sheet onto which the developer has been transferred is conveyed to a fixing unit 207B, where fixing of the developed image on the recording sheet is performed by heat and pressure.

The recording sheet passing through the fixing unit 207B is discharged by discharge rollers 208B. A sorter 220B sorts recording sheets by accommodating the discharged recording sheet in a predetermined bin. When sorting of recording sheets is not set, the sorter 220B accommodates the discharged recording sheet in the uppermost bin.

When duplex recording is set, after being conveyed to the discharge rollers 208B, the recording sheet is again fed to a r-feeding conveying path by a flapper 209B by inversion of the direction of rotation of the discharge rollers 208B.

When multiplex recording is set, the recording sheet is guided to a re-feeding conveying path 210B by the flapper 209B so as not be conveyed to the discharge rollers 208B.

The recording sheet guided to the r-feeding conveying path is fed to the transfer unit 206B with the above-described timing.

Formation of latent images of respective colors, development of the latent images, and fixing of the developed images are realized by repeating the above-described processing four times using the above-described recording-sheet conveying mechanism.

According to the first embodiment, since detailed copying conditions can be set as specifying information, it is very effective from the viewpoint of security. A manuscript formed using a copying prohibiting sheet such as one that becomes entirely black when being copied cannot be copied without using the copier 100, thus, unauthorized copies can be prevented.

Second Embodiment

In a second embodiment of the present invention, instead of providing the main body of the copier 100 with the function relating to the storage unit 109 for storing specifying information, which is a feature of the present invention and image information, a server on a network is provided with such a function.

In the second embodiment, only the configuration and the operation different from those in the first embodiment will be specifically described.

Figure 7:
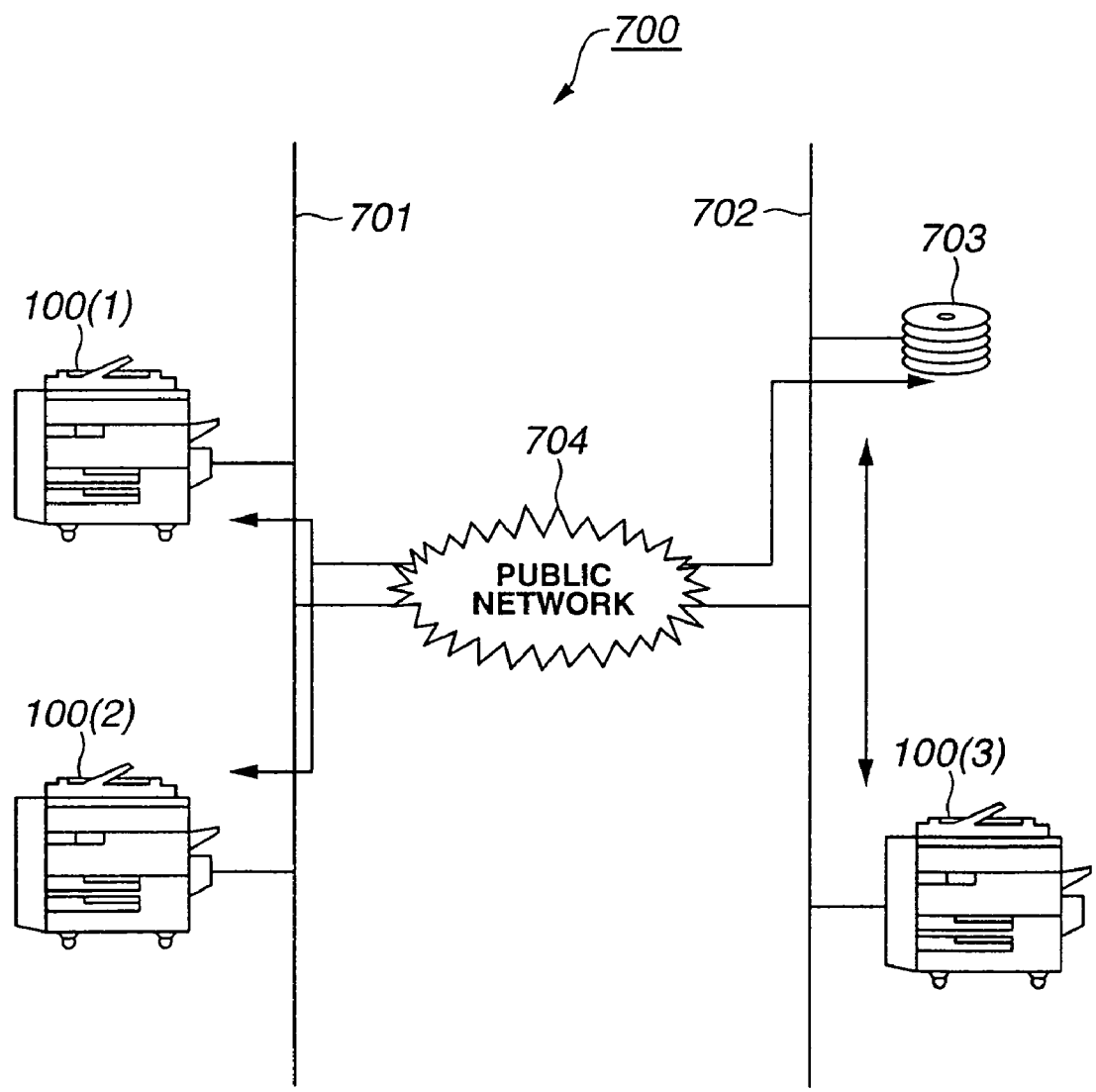
FIG. 7 is a diagram illustrating a system having the function of the copier shown in FIG. 1, according to a second embodiment of the present invention.

More specifically, for example, in a system 700 shown in FIG. 7, a server 703 has the same function as the storage unit 109. Each of copiers 100(1)-100(3) has the function of the image-information output unit 112 of the copier 100 shown in FIG. 1. The copiers 100(1) and 100(2), and the server 703 and the copier 100(3) are connected to networks 701 and 702, respectively.

Each of the networks 701 and 702 (network cables) is, for example, Ethernet (R). This is a network that can exchange information and transfer data between connected units according to a protocol, such as TCP/IP (transmission control protocol/internet protocol) or the like, using a physical cable, such as 10BaseT, 10Base5 or the like.

The present invention is not limited to a configuration in which respective units are connected with wires using network cables, such as the networks 701 and 702. For example, an environment as shown in FIG. 7 may be constructed using radio transmission.

A public network 704, such as a telephone network or the like, has the role of interconnecting connection environments (network environments) of respective units constructed by the networks 701 and 702.

Specifying information includes information specifying an apparatus that stores image information (for example, an IP address or the like), and information indicating a location where the image information is stored within the apparatus (generically represented by a uniform resource locator (URL)).

In the above-described environment, by providing a configuration in which specifying information, that is a feature of the present invention, and image information are stored in the server 703, copying can be performed using any one of the copiers 100(1)-100(3) of the second embodiment that are connected to the networks 701 and 702. That is, copying in which security management is executed can be performed at any location.

More specifically, for example, an arbitrary one 100(x) of the copiers 100(1)-100(3) first provides the server 703 with a request to refer to specifying information via the network 701 or 702.

The server 703 executes the processing shown in FIG. 6, and when the result of the processing is "Good", transmits image information corresponding to specifying information to the copier 100(x).

The copier 100(x) performs a series of image forming processes for the image information from the server 703, and prints the corresponding image.

In the above-described second embodiment, since security management is also performed based on specifying information, copying is not performed without permission as in conventional cases. Furthermore, since a manuscript formed using a copying prohibiting sheet cannot be copied without using the system 700, unauthorized copying can be prevented.

Third Embodiment

In the first and second embodiments, in the original-manuscript forming processing shown in FIG. 3, an original manuscript (image information) and specifying information are generated using a copier based on a printout that has been prepared in advance.

In a third embodiment of the present invention, however, a personal computer (PC) causes a printer to perform printing, where the specifying information is embedded in advance of the printing operation.

For that purpose, in the third embodiment, a printer has not only the function of outputting image information on a sheet (the function of the image-information output unit 112), but also the function of printing image information by embedding specifying information therein, similar to function described in the first embodiment. The printer, or a PC for generating image information has the function of simultaneously storing the image information and specifying information embedded therein in the storage unit 109 or the server 703.

The above-described functions can be realized without having to execute the process of step S301 (reading of an original image) in the original-manuscript forming processing shown in FIG. 3. The remaining steps of the above-described third embodiment are similar to the remaining steps shown in FIG. 3. Hence, the detailed description provided for FIG. 3 above is applicable to above-described third embodiment.

In the above-described third embodiment, security management can also be performed for a printed image. As in the first and second embodiments, by utilizing a copying prohibiting sheet when outputting an original manuscript using a printer, copying without using the system of the third embodiment is prohibited, and unauthorized copying can be prevented.

In the embodiments discussed above, an original manuscript that has been subjected to electronic processing is acquired and printed by recognizing specifying information in the original manuscript. Accordingly, when the original manuscript subjected to electronic processing is a color image and a manuscript used for acquisition is a monochrome image, it is also possible to acquire the color image by reading the monochromatic image.

When an original manuscript has a plurality of pages, only the first page where specifying information is embedded suffices for acquiring the original manuscript. Hence, it is possible to acquire an original manuscript having a plurality of pages from a single manuscript. In this case, the number of copy sets (the number of sets, each comprising a plurality of pages) is managed, so that copying can be performed only up to the number of copy sets that do not exceed the assigned number.

Although each of the above embodiments have described acquiring original information via copying or printing, original information may also be obtained via other mechanisms of transferring information, such as facsimiles and electronic mail.

The objects of the present invention may, of course, be achieved by supplying a system or an apparatus with a storage medium storing program codes of software for realizing the functions of the host apparatus and the terminals of each of the above embodiments, and reading and executing the program codes stored in the storage medium by means of a computer (e.g., CPU or micro-processor (MPU)) of the system or apparatus.

In such a case, the program codes realize the functions of each of the above embodiments, such that the storage medium storing the program codes and the program codes constitute the present invention.

A read-only memory (ROM), a floppy disk, a hard disk, an optical disk, a magneto-optical disk, a read-only compact disc (CD-ROM), a read/write compact disc CD-R, a magnetic tape, a nonvolatile memory card or the like may be used as the storage medium for supplying the program codes.

The present invention may, of course, also be applied not only to a case in which the functions of each of the above embodiments are realized by executing program codes read by a computer, but also to a case in which an operating system (OS) or the like operating in a computer executes a part or the entirety of actual processing, and the functions of each of the above embodiments are realized by the processing.

Still yet another application of the present invention may be a case in which, after writing program codes read from a storage medium into a memory provided in a function expanding board inserted into a computer or in a function expanding unit connected to the computer, a CPU or the like, the function expanding board or the function expanding unit perform a part or the entirety of actual processing, and the functions of each of the above embodiments are realized by the processing.

Figure 8:
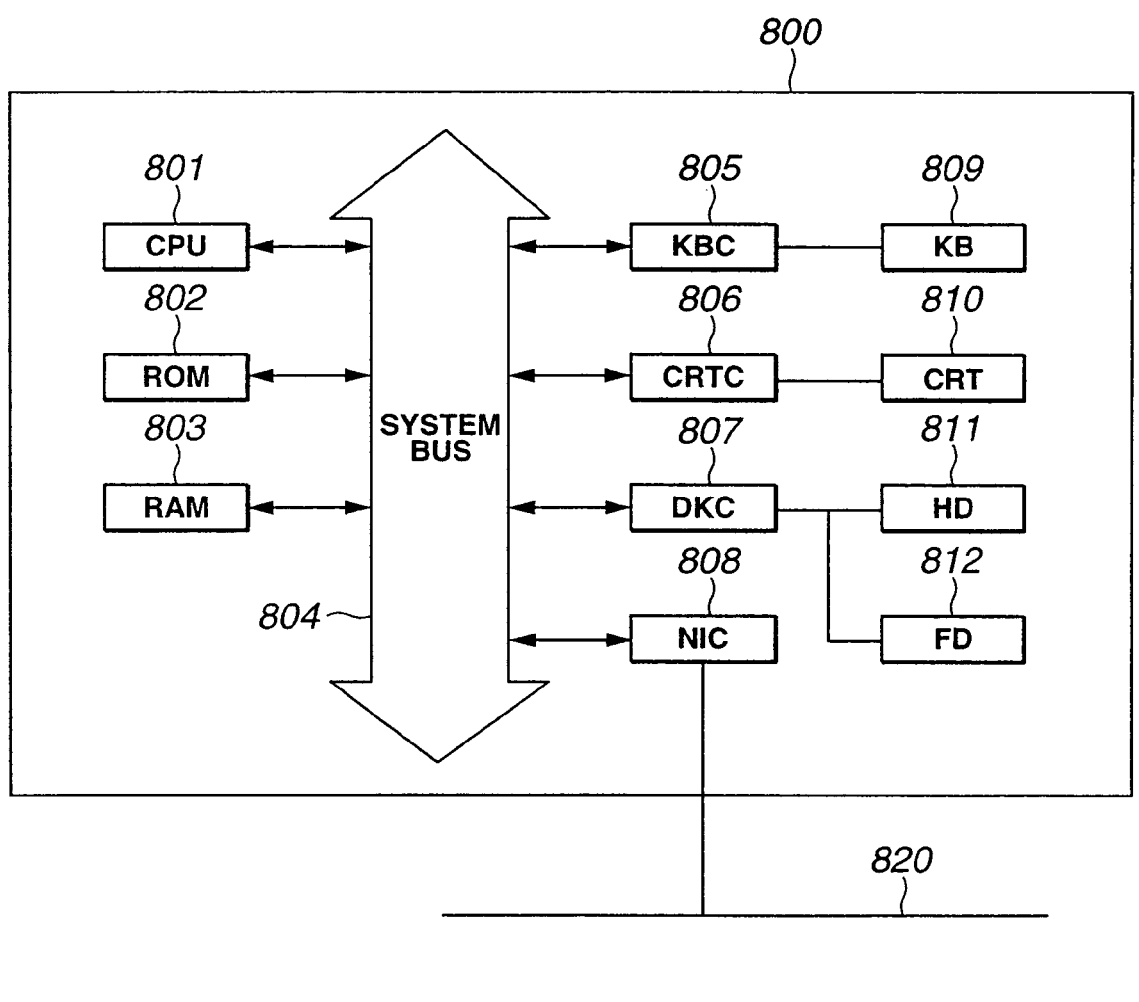
FIG. 8 is a block diagram illustrating the configuration of a computer for reading a program for causing the computer to execute the function of the copier shown in FIG. 1 from a computer readable storage medium, and executing the read program.

FIG. 8 illustrates a function 800 of the above-described computer.

As shown in FIG. 8, in the computer function 800, a CPU 801, a ROM 802, a RAM (random access memory) 803, a keyboard controller (KBC) 805 for a keyboard (KB) 809, a CRT controller (CRTC) 806 for a CRT display (CRT) 810, a disk controller (DKC) 807 for a hard disk (HD) 811 and a floppy disk (FD) 812, and a network interface controller (NIC) 808 for connection to a network 820 are interconnected so as to be able to communicate via a system bus 804.

The CPU 801 controls the respective components connected to the system bus 804 by executing software stored in the ROM 802, the HD 811, or software supplied from the FD 812.

That is, the CPU 801 performs control for realizing the operations in the above embodiments by reading a process program conforming to a predetermined process sequence from the ROM 802, the HD 811 or the FD 812 and executing the read program. The RAM 803 operates as a main memory, a working area, and the like of the CPU 801. The KBC 805 controls instruction input from the KB 809, a pointing device (not shown), or the like. The CRT 806 controls display on the CRT 810. The DKC 807 controls access to the HD 811 and the FD 812, storing boot programs, various application programs, editing files, user files, network managing programs, predetermined processing programs in the embodiments, and the like. The NIC 808 performs two-way data exchange with an apparatus or a system on the network 820.

According to the above-described embodiments, first predetermined information (specifying information) is added to an original manuscript. When copying the original manuscript, corresponding image information (image information of the original manuscript) that has been stored in advance is output (copied or transmitted), based on the result of comparison of the first predetermined information of the original manuscript with second predetermined information that has been stored in advance.

As indicated earlier, according to the above-described configuration, by setting detailed copying conditions as specifying information, very effective security management can be performed.

More specifically, an original manuscript formed using a copying prohibiting sheet that becomes entirely black when being copied cannot be copied without using an apparatus or a system having the above-described configuration. Furthermore, by assigning various types of information relating to security, such as the allowed number of printouts (copies), a password, a date for allowing copying, and the like, unauthorized use can be prevented.

Since copying is performed using image information that has been stored in advance, copies having excellent picture quality can be repeatedly provided.

The individual components shown in outline or designated by blocks in the drawings are all well known in the image processing system arts and their specific construction and operation are not critical to the operation or the best mode for carrying out the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus comprising:

an input unit for inputting image information;

a generating unit for generating output limitation information corresponding to the image information input by the input unit, the generated output limitation information indicating a limitation of the number of outputs of the input image information;

a storing unit for storing the image information input by the input unit and the output limitation information generated by the generating unit;

a reading unit for reading a document, wherein the document contains specifying information specifying the image information stored by the storing unit;

an output unit for outputting the specified image information stored by the storing unit in accordance with reading of the specifying information by the reading unit;

a counting unit for counting the number of outputs by the output unit every time the image information stored by the storing unit is output by the output unit; and an output control unit for determining whether to allow the outputting of the image information specified by reading the specifying information based on the output limitation information corresponding to the image information and the number of outputs counted by the counting unit and for controlling the outputting of the image information by the output unit in accordance with the determination, wherein the output control unit determines that outputting by the output unit of the image information specified by reading the specifying information is to be limited in a case where the number of outputs counted by the counting unit exceeds the limitation of the number of outputs of the input image information indicated by the generated output limitation information.

2. An image processing apparatus according to claim 1, wherein said input unit inputs the image information by reading an image on a document.

3. An image processing apparatus according to claim 1, wherein said output unit prints an image representing the image information on a recording medium.

4. An image processing apparatus according to claim 1, wherein said output unit sends the image information.

5. An image processing apparatus according to claim 1, further comprising a connector arranged to connect said apparatus to a network, wherein the specifying information indicates the storage location of the image information on the network.

6. An image processing apparatus according to claim 1, wherein the output limitation information includes an output allowance page count, wherein the output of the image information is limited based on the output allowance page count.

7. An image processing apparatus according to claim 1, wherein the image information is inputted to the input unit from a source external to the image processing apparatus.

8. An image processing apparatus according to claim 1, wherein outputting the image information is based on the result of comparing the output limitation information stored by the storing unit with the specifying information read by the reading unit.

9. An image output method comprising:

an input step of inputting image information;

a generating step of generating output limitation information corresponding to the image information input by the input step, the generated output limitation information indicating a limitation of the number of outputs of the input image information;

a storing step of storing the image information input in the input step and the output limitation information generated in the generating step;

a reading step of reading a document, wherein the document contains specifying information for specifying the image information stored in the storing step;

an output step of outputting the image information stored in the storing step in accordance with reading of the specifying information in the reading step;

a counting step for counting the number of outputs by the output step every time the stored image information is output in the output step; and an output control step for determining whether to allow the outputting of the image information specified by reading the specifying information based on the output limitation information corresponding to the image information and the number of outputs counted by the counting step and, for controlling the outputting of the image information by the output step in accordance with the determination, wherein the output control step determines that outputting by the output step of the image information specified by reading the specifying information is to be limited in a case where the number of outputs counted by the counting step exceeds the limitation of the number of outputs of the input image information indicated by the generated output limitation information.

10. An image output method according to claim 9, wherein said input step inputs the image information by reading an image on a document.

11. An image output method according to claim 9, wherein said output step prints an image representing the image information on a recording medium.

12. An image output method according to claim 9, wherein said output step outputs the image information based on the result of comparing the output limitation information stored in the storing step with the specifying information read in the reading step.

13. An image output method according to claim 9, wherein the image information is inputted to the input step from an external source.

14. A computer executable program, stored in a storage medium comprising:

an input step of inputting image information;

a generating step of generating output limitation information corresponding to the image information input by the input step, the generated output limitation information indicating a limitation of the number of outputs of the input image information;

a storing step of storing the image information input in the input step and the output limitation information generated in the generating step;

a reading step of reading a document, wherein the document contains specifying information for specifying the image information stored in the storing step;

an output step of outputting the image information stored in the storing step in accordance with reading of the specifying information in the reading step;

a counting step for counting the number of outputs by the output step every time the stored image information is output in the output step; and an output control step for determining whether to allow the outputting of the image information specified by reading the specifying information based on the output limitation information corresponding to the image information and the number of outputs counted by the counting step and for controlling the outputting of the image information by the output step in accordance with the determination, wherein the output control step determines that outputting by the output step of the image information specified by reading the specifying information is to be limited in a case where the number of outputs counted by the counting step exceeds the limitation of the number of outputs of the input image information indicated by the generated output limitation information.

15. Computer executable program, stored in a storage medium, according to claim 14, wherein said input step inputs the image information by reading an image on a document.

16. Computer executable program, stored in a storage medium, according to claim 14, wherein said output step outputs the image information based on the result of comparing the output limitation information stored in the storing step with the specifying information read in the reading step.

17. Computer executable program, stored in a storage medium, according to claim 14, wherein the image information is inputted to the input step from an external source.

* * * * *